United States Patent
Schillings et al.

(10) Patent No.: US 10,114,445 B2
(45) Date of Patent: Oct. 30, 2018

(54) SCREEN TIMEOUT DURATION

(71) Applicant: Facebook, Inc., Menlo Park, CA (US)

(72) Inventors: Benoit M. Schillings, Los Altos, CA (US); David Harry Garcia, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 25 days.

(21) Appl. No.: 13/663,132

(22) Filed: Oct. 29, 2012

(65) Prior Publication Data

US 2014/0123156 A1    May 1, 2014

(51) Int. Cl.
G06F 3/00    (2006.01)
G06F 1/32    (2006.01)
G06F 9/54    (2006.01)
G06F 21/45   (2013.01)

(52) U.S. Cl.
CPC .......... *G06F 1/3265* (2013.01); *G06F 1/3206* (2013.01); *G06F 1/3218* (2013.01); *G06F 9/54* (2013.01); *G06F 21/45* (2013.01); *G06F 2221/2137* (2013.01); *Y02D 10/153* (2018.01)

(58) Field of Classification Search
CPC .................................. G06F 9/54; G06F 1/32
USPC ....................................................... 719/310
See application file for complete search history.

(56) References Cited

U.S. PATENT DOCUMENTS

| 7,389,434 | B2 * | 6/2008 | Switzer et al. | 713/320 |
|---|---|---|---|---|
| 7,825,908 | B2 * | 11/2010 | Garmon | 345/173 |
| 7,890,778 | B2 * | 2/2011 | Jobs et al. | 713/300 |
| 8,601,301 | B1 * | 12/2013 | Arscott et al. | 713/320 |
| 2002/0095222 | A1 * | 7/2002 | Lignoul | 700/13 |
| 2003/0137535 | A1 * | 7/2003 | Heo | 345/741 |
| 2006/0045343 | A1 * | 3/2006 | Tremblay et al. | 382/186 |
| 2006/0053315 | A1 * | 3/2006 | Menzl | 713/300 |
| 2006/0111809 | A1 * | 5/2006 | Etter | G05B 19/409 700/180 |
| 2008/0136785 | A1 * | 6/2008 | Baudisch | G06F 3/0488 345/173 |
| 2008/0168290 | A1 * | 7/2008 | Jobs et al. | 713/324 |
| 2008/0188268 | A1 * | 8/2008 | Kim et al. | 455/566 |
| 2008/0244447 | A1 * | 10/2008 | Sagar | 715/810 |

(Continued)

OTHER PUBLICATIONS

Batur, A Proposed Application of an Industrial DOS Computer for Distribution Substation Monitoring and Control, Apr. 1994.*

*Primary Examiner* — Lechi Truong
(74) *Attorney, Agent, or Firm* — Baker Botts L.L.P.

(57) ABSTRACT

In one embodiment, a method includes determining for each of multiple countdowns to an automatic screen timeout of a computing device whether the countdown was too long or too short. The countdown is too short if user interaction with the computing device occurred within a first pre-determined amount of time after the automatic screen timeout. The countdown is too long if user interaction with the computing device turned off a screen of the computing device prior to a second pre-determined amount of time before the automatic screen timeout. The method includes determining an underage of each of one or more of the countdowns that was too short; determining an overage of each of one or more of the countdowns that was too long; and adjusting a countdown length of the automatic screen timeout based at least in part on the underages or overages.

16 Claims, 4 Drawing Sheets

(56) References Cited

U.S. PATENT DOCUMENTS

2010/0306392 A1* 12/2010 Fell, Jr. .................. H04L 67/14
   709/228
2013/0260717 A1* 10/2013 Miyaki ................. H04W 12/08
   455/411
2014/0101472 A1* 4/2014 Rohrweck .................... 713/323

* cited by examiner

SCREEN TIMEOUT DURATION

TECHNICAL FIELD

This disclosure generally relates to screen-timeout functionality of a computing device.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Users of a mobile computing device may have experiences where the duration of an automatic screen timeout is too short or too long. Particular embodiments illustrate examples of adjusting the automatic screen timeout to be longer or shorter based on whether the automatic screen timeout was too short or too long.

DESCRIPTION OF EXAMPLE EMBODIMENTS

Figure 1:
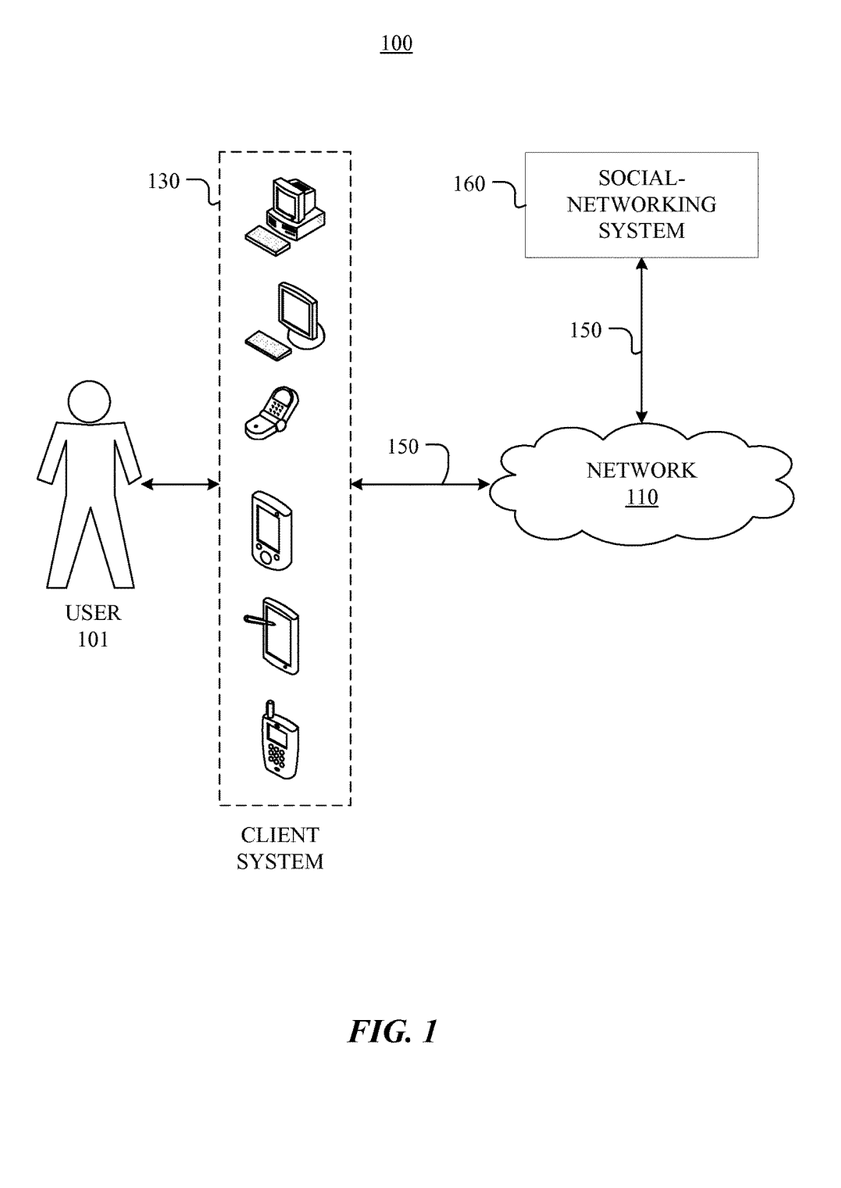
FIG. 1 illustrates an example network environment associated with a social-networking system.

FIG. 1 illustrates an example network environment 100 associated with a social-networking system. Network environment 100 includes a user 101, a client system 130, and a social-networking system 160, connected to each other by a network 110. Although FIG. 1 illustrates a particular arrangement of user 101, client system 130, social-networking system 160, and network 110, this disclosure contemplates any suitable arrangement of user 101, client system 130, social-networking system 160, and network 110. As an example and not by way of limitation, two or more of client system 130, and social-networking system 160, may be connected to each other directly, bypassing network 110. As another example, two or more of client system 130, and social-networking system 160 may be physically or logically co-located with each other in whole or in part. Moreover, although FIG. 1 illustrates a particular number of users 101, client systems 130, social-networking systems 160, and networks 110, this disclosure contemplates any suitable number of users 101, client systems 130, social-networking systems 160, and networks 110. As an example and not by way of limitation, network environment 100 may include multiple users 101, client system 130, social-networking systems 160, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, one or more users 101 may use one or more client systems 130 to access, send data to, and receive data from social-networking system 160.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of a third-party system, which is separate from social-networking system 160 and coupled to social-networking system 160 via a network 110. In particular embodiments, social-networking system 160 may include an authorization server that allows users 101 to opt in or opt out of having their actions logged by social-networking system 160 or shared with other systems (e.g., third-party systems), such as, for example, by setting appropriate privacy settings.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing."

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130 and social-networking system 160 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130. Client system 130 may access social-networking system 160 directly, via network 110, or via a third-party system. As an example and not by way of limitation, client system 130 may access a third-party system via social-networking system 160.

In particular embodiments, client system 130 may include various types of sensors, for example and without limitation: touch sensors (disposed, for example, on a display of the client system, the back of the client system and one or more lateral edges of the client system) for detecting a user touching the surface of the client system (e.g., using one or more fingers); an accelerometer for detecting whether the client system is moving and the speed of the movement; a thermometer for measuring the temperature change near the client system; proximity sensors for detecting the proximity of the client system to another object (e.g., a hand, desk, or other object); light sensors for measuring the ambient light around the client system; imaging sensors (e.g., camera) for capturing digital still images and/or video of objects near the client system (e.g., scenes, people, bar codes, QR codes, etc.); location sensors (e.g., Global Positioning System (GPS)) for determining the location (e.g., in terms of latitude and longitude) of the client system; sensors for detecting communication networks within close proximity (e.g., near field communication (NFC), Bluetooth, RFID, infrared); chemical sensors; and biometric sensors for biometrics-based (e.g., fingerprint, palm vein pattern, hand geometry, iris/retina, DNA, face, voice, olfactory, sweat) authentication of a user of client system. This disclosure contemplates that a client system may include any applicable type of sensor. Sensors may provide various types of sensor data, which may be analyzed to determine the user's intention with respect to the client system at a given time.

Client system 130 may include an automatic screen timeout setting that is associated with a countdown to the initiation of the screen timeout. An automatic screen timeout may control how long it takes the screen to power down when client system 130 is not being used. An automatic screen timeout may secure client system 130, preventing unauthorized access or data loss if client system is lost or stolen. Where client system 130 is battery operated, an automatic screen timeout may improve power management by increasing battery life as a result of reducing battery usage by the screen. In particular embodiments, the countdown specifies how much idle time (e.g. continuous time without user interaction with client system 130) must elapse before the screen turns off. The countdown may be a time of 1 second up to the screen being always on. In particular embodiments, the countdown may be fixed where the countdown is determined by a preset time that is preprogrammed into client system 130 or a default time determined by social-networking system 160. In particular embodiments, the countdown may be adaptive where the countdown is initially determined by either a preset time of client system 130 or determined by social-networking system 160, but then changes in response to various user scenarios.

Figure 2:
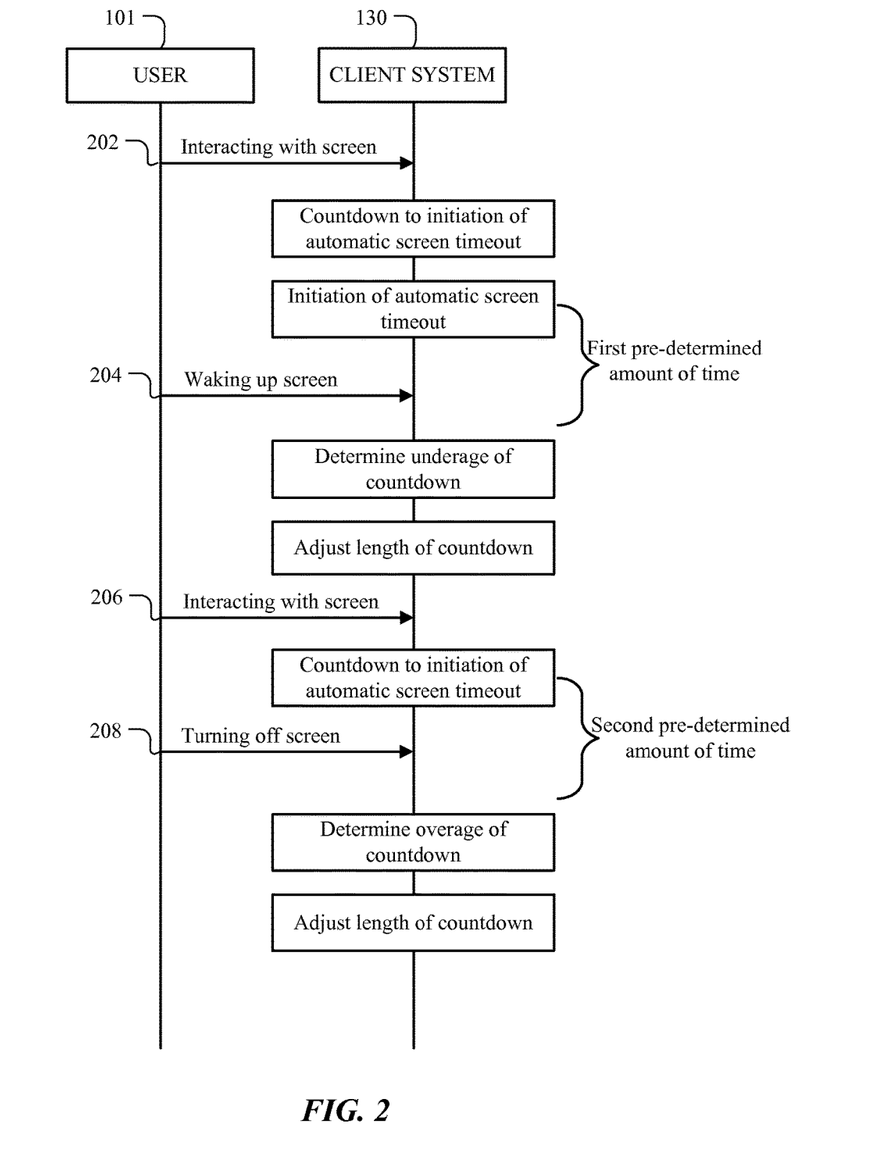
FIG. 2 illustrates example timeline of an example automatic screen timeout.

FIG. 2 illustrates an example timeline of an example automatic screen timeout according to one embodiment. In call 202, user 101 is interacting with a screen of client system 130. Interacting with a screen may include, but is not limited to, touching the screen of client system 130, running one or more applications on client system 130, accessing, sending data to, and receiving data from social-networking system 160, and holding client system 130 near user 101 or at a particular angle. For each occurrence where user 101 is no longer interacting with the screen of client system 130, a countdown to initiation of an automatic screen timeout begins counting down. At completion of the countdown, client system 130 initiates the automatic screen timeout and turns off the screen.

In call 204, user 101 wakes up the screen of client system 130 within a first pre-determined amount of time. For example, if the countdown was too short, user 101 may wake up the screen of client system 130 within the first pre-determined amount of time after the automatic screen timeout turned off the screen. Client system 130 may determine a duration underage of the countdown for each occurrence of the automatic screen timeout that was too short. Client system 130 adjusts a length of the countdown based at least in part on the duration underages.

In call 206, user 101 interacts with the screen of client system 130 in a same or similar manner as described above with respect to call 202. For each occurrence where user 101 is no longer interacting with the screen of client 130, a countdown to initiation of an automatic screen timeout begins counting down. In call 208, user turns off the screen of client system 130 within a second pre-determined amount of time. For example, if the countdown was too long, user 101 may turn off the screen of client system 130 within the second pre-determined amount of time prior to initiation of the automatic screen timeout. Client system 130 may determine a duration overage of the countdown for each occurrence of the automatic screen timeout with a countdown that was too long. Client system 130 adjusts the length of the countdown based at least in part on the duration overages in addition to the duration underages. Particular embodiments may repeat one or more calls and steps described here with respect to FIG. 2, where appropriate. Although this disclosure describes and illustrates particular calls occurring in a particular order, this disclosure contemplates any suitable calls of FIG. 2 occurring in any suitable order.

Figure 3:
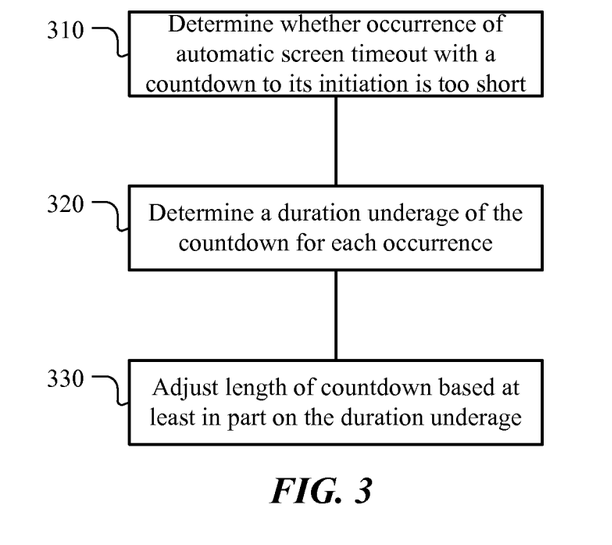
FIG. 3 illustrates an example method for adjusting a length of a countdown.

Users of client system 130 may have an experience where the duration of the countdown for an automatic screen timeout is too short. That is, a user may be interacting with client device 130, a user may pause from interacting with client device for some amount of time, the screen goes black and is black for a time, and the user must then tap on the screen and re-login to client system 130. FIG. 3 illustrates an example method for adjusting a length of a countdown based at least in part on duration underages of the countdown. The method may begin at step 310, where a computing device determines whether a duration of a countdown to an initiation of a screen timeout is too short. The countdown to an initiation of a screen timeout may be too short where the user interacts with client device 130 in order to wake it up within a first pre-determined amount of time after initiation of the automatic screen timeout. A first pre-determined amount of time after initiation of the automatic screen timeout may be any time between 0.01 seconds and infinity.

At step 320, the computing device determines a duration underage of the countdown for each occurrence of the automatic screen timeout with a countdown that was too short. In particular embodiments, the duration underage of the countdown that was too short equals an amount of time from initiation of the automatic screen timeout to user interaction with the computing device waking up the computing device within the first pre-determined amount of time. At step 330, the computing device adjusts the length of the countdown based in part on the duration underages. In particular embodiments, the countdown may be adjusted to be longer based on the duration underages.

Figure 4:
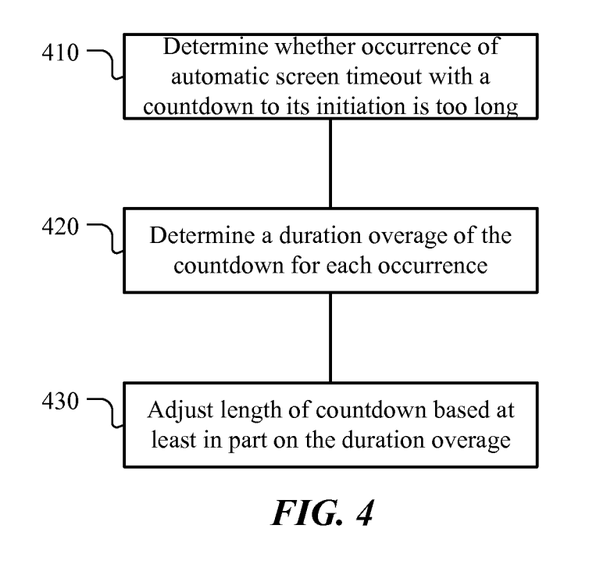
FIG. 4 illustrates another example method for adjusting a length of a countdown.

Users of client system 130 may have an experience where the duration of the countdown for an automatic screen timeout is too long. That is, a user may be interacting with client device 130, pause from interacting with client device 130 for some amount of time, and, before the screen times out (e.g. goes dark), manually initiate screen timeout. FIG. 4 illustrates an example method for adjusting a length of a countdown based at least in part on duration overages of the countdown in addition to the duration underages. The method may begin at step 410, where a computing device determines whether a duration of a countdown to an initiation of a screen timeout is too long. The countdown to the initiation of an automatic screen timeout may have been too long if there was user interaction with the computing device to manually initiate the automatic screen timeout prior to a second pre-determined amount of time before initiation of the automatic screen timeout. A second pre-determined amount of time before initiation of the automatic screen timeout may be any time between 0.01 seconds and the countdown.

At step 420 the computing device determines a duration overage of the countdown for each occurrence of the automatic screen timeout with a countdown that was too long. In particular embodiments, the duration overage of the countdown that was too long equals an amount of time from the user manually initiating the automatic screen timeout prior to the second pre-determined amount of time before initiation of the automatic screen timeout. In particular embodiments, the first pre-determined amount of time and the second pre-determined amount of time are the same amount of time. In particular embodiments, the first pre-determined amount of time is shorter than the second pre-determined amount of time. At step 430, the computing device adjusts the length of the countdown based in part on the duration overages in addition to the duration underages. In particular embodiments, the countdown may be adjusted to be longer based on the duration underages and shorter based on the duration overages.

Particular embodiments may repeat one or more steps of the method of FIGS. 3-4, where appropriate. Although this disclosure describes and illustrates particular steps of the methods of FIGS. 3-4 as occurring in a particular order, this disclosure contemplates any suitable steps of the methods of FIGS. 3-4 occurring in any suitable order. Moreover, although this disclosure describes and illustrates particular components, devices, or systems carrying out particular steps of the methods of FIGS. 3-4, this disclosure contemplates any suitable combination of any suitable components, devices, or systems carrying out any suitable steps of the methods of FIGS. 3-4.

In particular embodiments, the countdown of the automatic screen timeout with a countdown to its initiation may be based on data including data from social-networking system 160. In particular embodiments, duration underages or duration overages may be based on social context. The length of the countdown may be adjusted based on duration underages and duration overages that are associated with a social context in social-networking system 160. A social context in social-networking system 160 may include, but are not limited to, any features associated with one or more social graphs, actions a user has taken with respect to items or objects, and profile information of the user. In particular embodiments, for example, the duration underages and duration overages may be associated with events logged in social-networking system, such as a user is at a party at a restaurant with several friends that the user is associated with on social-networking system 160. In particular embodiments, the duration underages and duration overages may be associated with situational data of a user, such as time and place.

In particular embodiments, duration underages and duration overages may be associated with various aspects of client system 130. The length of the countdown may be adjusted based on duration underages and duration overages that are associated with particular applications running on client system 130, the size of the screen of client system 130, the position or angle of client system 130, and various inputs from one or more sensors of client system 130. For example, if a particular application is running on client system 130, that may indicate that a user is interacting with client system 130 and that the countdown should be longer. Where a user is running an application, such as a game, the screen timeout may be disabled. Where a user has recently received a message, the length of the countdown may be longer because the user may read the message within an amount of time. As another example, the length of the countdown may be longer for larger screens of client system 130 where a user may be more likely to read an entire page, as opposed to smaller screens where a user may be less likely to read an entire page and thus the countdown may be shorter. Where an angle of client system 130 is between 1 and 90 degrees, the length of the countdown may be longer because when client system 130 is at such an angle, a user may be more likely to be interacting with client system 130. Whereas, if the angle of client system 130 is 0 degrees, this may indicate that the user is not interacting with client system 130. In particular embodiments, sensors, such as light sensors and infrared sensors, may detect distance or location that suggests that a user is more or less likely to be interacting with client system 130. For example, duration underages and duration overages may be associated with an infrared sensor detecting that client system is close to a user's face. For example, duration underages and duration overages may be associated with a light sensor detecting little or no light, which may indicate that a user is not interacting with client system 130 because client system 130 is in a user's pocket.

Figure 5:
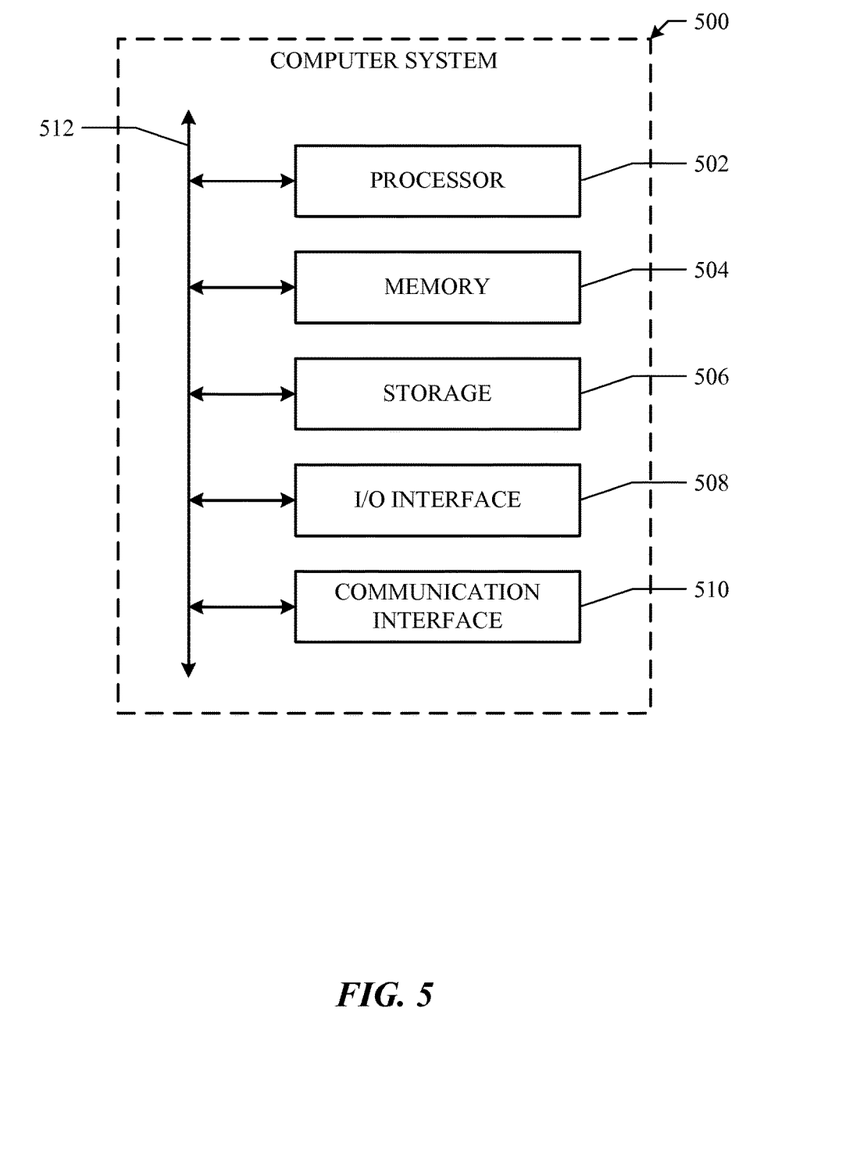
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506;

or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, determining a duration overage for a length of a countdown to an automatic timeout to power down a screen of the computing device, wherein the computing device determines an overage if a type of user interaction with the computing device turns off the screen during the countdown and prior to first a pre-determined amount of time before the end of the countdown;
   by a computing device, determining a duration underage for a length of a countdown to an automatic timeout to power down a screen of the computing device, wherein the computing device determines an underage if a type of user interaction wakes up the screen of the device within a second pre-determined amount of time after the automatic timeout turns off the screen, wherein the first pre-determined amount of time is equal to or shorter than the second pre-determined amount of time; and
   by the computing device, adjusting the length of the countdown to an automatic timeout to power down the screen of the computing device based on the duration overage in addition to the duration underage and further based on one or more physical characteristics of the computing device including: a physical screen size of the computing device and an angle of the computing device.

2. The method of claim 1, wherein the first pre-determined amount of time equals the second pre-determined amount of time.

3. The method of claim 1, wherein the second pre-determined amount of time is shorter than the first pre-determined amount of time.

4. The method of claim 1, wherein adjusting the length of the countdown is further based at least in part on one or more of:
   one or more applications running on the computing device;
   a social context described by a social graph, wherein the duration underages and duration overages are associated with events logged in social-networking system; and
   sensor data received by the computing device.

5. The method of claim 4, further comprising:
   determining the social context based at least in part on social-networking data received from a social-networking system.

6. One or more computer-readable non-transitory storage media embodying software that is operable when executed to:
   determine a duration overage for a length of a countdown to an automatic timeout to power down a screen of a computing device, wherein an overage is determined if a type of user interaction with the computing device turns off the screen during the countdown and prior to a first pre-determined amount of time before the end of the countdown;
   determine a duration underage for a length of a countdown to an automatic timeout to power down a screen of the computing device, wherein the computing device determines an underage if a type of user interaction wakes up the screen of the device within a second pre-determined amount of time after initiation of the automatic screen timeout, wherein the first pre-determined amount of time is equal to or shorter than the second pre-determined amount of time; and
   adjust the length of the countdown to an automatic timeout to power down the screen of the computing device, based on the duration overage in addition to the duration underage and further based on one or more physical characteristics of the computing device including: a physical screen size of the computing device and an angle of the computing device.

7. The media of claim 6, wherein the software is further operable when executed to:
   determine an underage or an overage for the adjusted length of the countdown, wherein the computing device determines an underage if a second type of user interaction with the computing device occurs within a second pre-determined amount of time after the end of the countdown, wherein the second type of user interaction would have reset the countdown if the second type of user interaction had occurred during the countdown; and adjust the adjusted length of the countdown to be longer or shorter based at least in part on the underage or the overage determined for the adjusted length of the countdown.

8. The media of claim 7, wherein the first pre-determined amount of time equals the second pre-determined amount of time.

9. The media of claim 7, wherein the second pre-determined amount of time is shorter than the first pre-determined amount of time.

10. The media of claim 6, wherein adjusting the length of the countdown is further based at least in part on one or more of:
- a social context;
- one or more applications running on the computing device;
- one or more physical characteristics of the computing device; or sensor data received by the computing device.

11. The media of claim 10, wherein the software is further operable when executed to:
determine the social context based at least in part on social-networking data received from a social-networking system.

12. A computing device comprising:
one or more processors; and
a memory coupled to the processors comprising instructions executable by the processors, the processors being operable when executing the instructions to:
determine a duration overage for a length of a countdown to an automatic timeout to power down a screen of the computing device, wherein the computing device determines an overage if a type of user interaction with the computing device turns off the screen during the countdown and prior to a first pre-determined amount of time before the end of the countdown, wherein the type of user interaction turns off the screen;
determine a duration underage for a length of a countdown to an automatic timeout to power down a screen of the computing device, wherein the computing device determines an underage if a type of user interaction wakes up the screen of the device within a second pre-determined amount of time after initiation of the automatic screen timeout, wherein the first pre-determined amount of time is equal to or shorter than the second pre-determined amount of time; and
adjust the length of the countdown to an automatic timeout to power down the screen of the computing device, based on the duration overage in addition to the duration underage and further based on one or more physical characteristics of the computing device including: a physical screen size of the computing device and an angle of the computing device.

13. The computing device of claim 12, wherein the processors are further operable when executing the instructions to:
determine an underage or an overage for the adjusted length of the countdown, wherein the computing device determines an underage if a second type of user interaction with the computing device occurs within a second pre-determined amount of time after the end of the countdown, wherein the second type of user interaction would have reset the countdown if the second type of user interaction had occurred during the countdown; and
adjust the adjusted length of the countdown to be longer or shorter based at least in part on the underage or the overage determined for the adjusted length of the countdown.

14. The computing device of claim 13, wherein the first pre-determined amount of time equals the second pre-determined amount of time.

15. The computing device of claim 13, wherein the second pre-determined amount of time is shorter than the first pre-determined amount of time.

16. The computing device of claim 12, wherein adjusting the length of the countdown is further based at least in part on one or more of:
- a social context;
- one or more applications running on the computing device;
- one or more physical characteristics of the computing device; or
- sensor data received by the computing device.

* * * * *